(12) United States Patent
Mitelman et al.

(10) Patent No.: US 8,270,529 B2
(45) Date of Patent: Sep. 18, 2012

(54) SOFTWARE-BASED SPREAD SPECTRUM SIGNAL PROCESSING

(75) Inventors: Alexander Mitelman, Stockholm (SE); Per-Ludvig Normark, Stockholm (SE); Christian Stahlberg, Sollentuna (SE)

(73) Assignee: Nordnav Technologies AB, Stockholm (SE)

( * ) Notice: Subject to any disclaimer, the term of this patent is extended or adjusted under 35 U.S.C. 154(b) by 936 days.

(21) Appl. No.: 12/303,529

(22) PCT Filed: Jun. 22, 2006

(86) PCT No.: PCT/SE2006/050215
§ 371 (c)(1),
(2), (4) Date: Dec. 4, 2008

(87) PCT Pub. No.: WO2007/149026
PCT Pub. Date: Dec. 27, 2007

(65) Prior Publication Data
US 2009/0257525 A1   Oct. 15, 2009

(51) Int. Cl.
*H04K 1/02* (2006.01)
*H04L 25/03* (2006.01)
*H04L 25/49* (2006.01)

(52) U.S. Cl. ........................................ 375/296; 701/408
(58) Field of Classification Search ................. 375/296; 701/408
See application file for complete search history.

(56) References Cited

U.S. PATENT DOCUMENTS

| | | | | |
|---|---|---|---|---|
| 5,268,927 A * | 12/1993 | Dimos et al. | | 375/147 |
| 5,311,194 A * | 5/1994 | Brown | | 342/357.24 |
| 5,517,633 A * | 5/1996 | Ohta et al. | | 711/146 |
| 6,002,363 A | 12/1999 | Krasner | | |
| 6,298,370 B1 * | 10/2001 | Tang et al. | | 718/102 |
| 6,725,354 B1 | 4/2004 | Kahle et al. | | |
| 2005/0081181 A1 * | 4/2005 | Brokenshire et al. | | 717/100 |
| 2006/0053424 A1 | 3/2006 | Koistinen et al. | | |

OTHER PUBLICATIONS

PCT/SE2006/050215, "International Preliminary Report on Patentability Chapter I," Dec. 22, 2008.*
International Search Report for PCT/SE2006/050215, dated Feb. 8, 2007.

* cited by examiner

*Primary Examiner* — Shuwang Liu
*Assistant Examiner* — Nader Bolourchi
(74) *Attorney, Agent, or Firm* — Moore & Van Allen, PLLC; W. Kevin Ransom

(57) ABSTRACT

A proposed data processing device includes at least two processor units, which each is adapted to process digitized pre-correlation navigation satellite signal data as well as to process alternative data and/or signals relating to at least one function being uncorrelated with the satellite signal data. The device includes at least one data buffer adapted to store data sets, where each set includes a number of instances of the satellite signal data. A control module in the device controls execution of a processing job with respect to a stored data set by allocating individual processing tasks to at least one of the at least two processor units based on a current processing load on each processor unit.

21 Claims, 2 Drawing Sheets

SOFTWARE-BASED SPREAD SPECTRUM SIGNAL PROCESSING

CROSS REFERENCE TO RELATED APPLICATION(S)

This application is a national phase application based on International Application No. PCT/SE2006/050215 with international filing date of Jun. 22, 2006 and entitled SOFTWARE-BASED SPREAD SPECTRUM SIGNAL PROCESSING, the contents of which are incorporated herein by reference.

THE BACKGROUND OF THE INVENTION AND PRIOR ART

The present invention relates generally to processing of spread spectrum signals and other types of data. More particularly the invention relates to processing digitized precorrelation navigation satellite signal data ($d_F$), and to processing alternative data and/or signals ($D_A$) relating to at least one function being uncorrelated with said satellite signal data.

Spread spectrum transmission solutions are becoming increasingly important, for instance in global navigation satellite systems (GNSS). Presently, the Global Positioning System (GPS; U.S. Government) is the dominant system. However, alternative systems are expected to gain increased importance in the future. So far, the Global Orbiting Navigation Satellite System (GLONASS; Russian Federation Ministry of Defense) and the Galileo system (the European programme for global navigation services) constitute the major alternative GNSSs. Various systems also exist for enhancing the coverage, the availability and/or the quality of at least one GNSS in a specific region. The Quasi-Zenith Satellite System (QZSS; Advanced Space Business Corporation in Japan), the Wide Area Augmentation System (WAAS; The U.S. Federal Aviation Administration and the Department of Transportation) and the European Geostationary Navigation Overlay Service (EGNOS; a joint project of the European Space Agency, the European Commission and Eurocontrol—the European Organization for the Safety of Air Navigation) represent examples of such augmentation systems for GPS, and in the latter case GPS and GLONASS.

A programmable software receiver solution is generally desired because it enables processing of many signal formats in one processor, e.g. a CPU (central processing unit) or a DSP (digital signal processor). In this case, it is straightforward to adapt the signal processing principles to a plurality of signal formats. A software-based GNSS receiver is also advantageous in that this kind of receiver may coexist efficiently with other types of signal receivers, signal processing devices and/or software applications, for example in a laptop computer, a mobile telephone, or a PDA (Personal Digital Assistant). Moreover, a software receiver generally provides a cost-efficient and power-efficient implementation.

U.S. Pat. No. 6,002,363 describes a combined apparatus including a GPS receiver and an integrated communication receiver, e.g. representing a cellular phone. Here, a single digital processor is shared between functions related to processing of GPS signals and functions related to processing of communication signals. To facilitate the use of shared circuitry, it is proposed that the GPS operation and the communications reception/transmission operation be performed at different times. However, no efficient solution for contemporaneous use of the single processor is described.

Some recent communication devices contain multiple processors. In these devices, even more efficient data and signal processing can be achieved by treating each processing task in a manner being optimal with respect to the characteristics of the task. This results in efficient use of available power, which in turn leads to comparatively low power consumption. This characteristic is key in portable devices having limited battery resources, e.g. laptop computers, mobile telephones and PDAs. Hence, it is advantageous to integrate a software-based GNSS receiver into a multiple processor design, wherein the processing resources are shared with other types of software functions.

However, attaining such integration is challenging due to (a) the demanding real time requirements of the GNSS signal processing and (b) the inherently unpredictable load associated with this processing. The challenges of integration are further complicated because the alternative functions also generate processing loads, which may be unpredictable and typically vary significantly over time. This problem becomes especially accentuated if the design includes multiple processing cores whose performance profiles may be differently well suited for different types of processing tasks.

Generally, the question of performing software operations on a platform including multiple processing elements is termed 'load balancing'. The prior art in this area includes several solutions for balancing load between two or more computers. U.S. Pat. No. 6,298,370 and the published US patent application No. 2005/0081181 represent examples of designs in this category. In the area of single-device implementations, the U.S. Pat. No. 6,725,354 presents a solution in which an adequate processing block is selected based on whether a processing task to be performed involves execution of fixed-point instructions or floating point instructions. Nevertheless, since all the prior approaches fail to address the strict real-time requirements of GNSS processing, none of these allows a software-implemented GNSS receiver to coexist with at least one function being uncorrelated thereto in a multiple processor environment.

SUMMARY OF THE INVENTION

The object of the present invention is therefore to solve the above problems, and thus provide a highly resource efficient solution enabling software-based signal processing to be implemented in a portable device, which is typically adapted to execute functions being uncorrelated with any satellite signal data extracted from the spread spectrum signals.

According to the invention, the object is achieved by the processing device as initially described, wherein the device includes at least two processor units, at least one data buffer, and a control module. Each of the at least two processor units is adapted to process the satellite signal data and to process the alternative data and/or signals. The at least one data buffer is adapted to store data sets, where each set includes a number of instances of the satellite signal data. The control module is adapted to control execution of a processing job. The job involves producing target data based on a source data set being stored in the at least one of the at least one data buffer. Specifically, the control module is adapted to allocate individual processing tasks to at least one of the at least two processor units based on a current processing load on each processor unit.

One important advantage of this design is that the digitized navigation satellite signals can be processed very efficiently with respect to available processor resources, required time and energy consumption.

According to preferred embodiments of the invention, the control module is further adapted to allocate the individual processing tasks to the processor units based on one or more of: a type of processing to be executed relative to a performance profile of the respective processor unit; an amount of processing to be executed with respect to the data set; and a time frame within which the processing job is to be completed. Thereby, an even more resource and power efficient implementation is attained.

According to another preferred embodiment of the invention, the control module is adapted to allocate the individual processing tasks to the processor units based on an allowed utilization of the respective processor unit. The allowed utilization here specifies a measure of the resources being potentially available for satellite signal processing. Hence, the processor units' different capacities to handle the satellite signal processing can be taken into consideration.

According to yet another preferred embodiment of the invention, each of the processor units is adapted to produce a set of target data resulting from a respective processing task completed by the unit. The target data may either be sent to a parent module having requested the processing job, or to one or more alternative units, modules or functions in the device.

According to a further preferred embodiment of the invention, each of the processor units is adapted to transmit a status signal to the control module. The status signals reflect a respective load status for the processor unit. Hence, the control module receives feedback information, which is relevant when allocating new processing tasks. The control module, in turn, is adapted to allocate said processing tasks based on the status signals.

According to yet another preferred embodiment of the invention, each of the processor units is adapted to receive a task specification defining a respective processing task to be executed by the unit. The task specification includes at least one entry specifying: a number of processing iterations to be completed with respect to the data set, at least one signal source identity (from which data is to be extracted), a type of processing to be performed, and/or a time requirement for the processing task. Thereby, by means of the task specifications, the control unit may send processing orders to the processor units. Preferably, each of the at least two processor units is also associated with a programmable module, which is adapted to store the task specification. Consequently, the task specifications can be preserved for access by the respective processor units while performing the processing tasks.

According to another preferred embodiment of the invention, it is presumed that the processing job involves performing operations according to a first type of arithmetic. Furthermore, at least one of the processor units is adapted to perform computations based on a second type of arithmetic. Each of the programmable modules, which is associated with the at least one of the processor units, is adapted to store an instruction set adapted to convert a processing task from a first type of task defined in the first type of arithmetic to an equivalent task defined in the second type of arithmetic. Hence, a floating point processing task can be converted into a fixed-point processing task, and vice versa.

According to still another preferred embodiment of the invention, at least one of the processor units is represented by a central processing unit (CPU), e.g. of dual-core type. Preferably, the control module is implemented in software, and the module is included in one of the at least two processor units, for instance the CPU. This is advantageous in that the control module becomes readily accessible for verification and updating. Additionally, the CPU is typically the master unit for the co-processing units with respect to other tasks.

According to a further preferred embodiment of the invention, at least one of the processor units is represented by a digital signal processing unit (DSP), a graphics processing unit (GPU), a vector processor unit (VPU), a media processing unit (MPU), an audio processing unit (APU), a floating-point processing unit, or an accelerator unit (e.g. of GNSS type). Thus, whenever resources become available in one or more of these units, portions of the navigation satellite signal processing can be effected here.

According to another aspect of the invention the object is achieved by the method described initially, wherein the method involves producing target data based on a data set stored in at least one of the at least one data buffer. At least two processor units are used, and individual processing tasks of a processing job are allocated to at least one of the processor units based on a current processing load on each processor unit.

The advantages of this method, as well as the preferred embodiments thereof, are apparent from the discussion above with reference to the proposed receiver.

According to a further aspect of the invention the object is achieved by a computer program product, which is directly loadable into the memory of a computer, and includes software for controlling the method proposed above when said program is run on a computer.

According to another aspect of the invention the object is achieved by a computer readable medium, having a program recorded thereon, where the program is to control a computer to perform the method proposed above.

Further advantages, beneficial features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
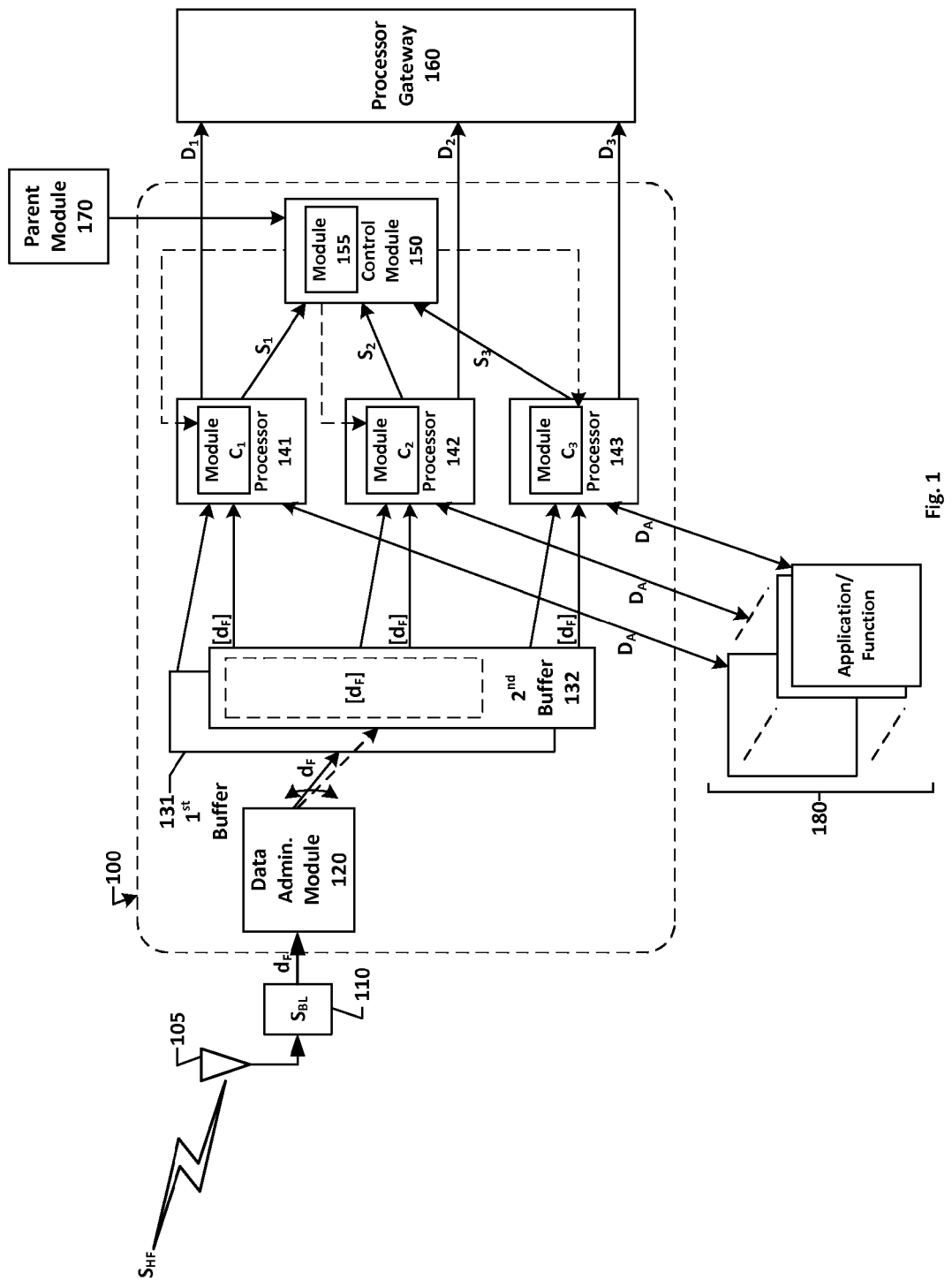
FIG. 1 shows a block diagram of a processing device according to one embodiment of the invention.

We refer initially to FIG. 1 showing a block diagram of a data processing device 100 according to one embodiment of the invention. The device 100 includes at least two processor units. In this example three units 141, 142 and 143 are shown. The device 100 also includes at least one data buffer 131 and 132, and a control module 150.

The device 100 is preferably adapted to receive the data $d_F$ from a radio front end unit 110, which produces a band limited and digitized representation $S_{BL}$ of navigation satellite signals $S_{HF}$ having been received via an antenna means 105. The data $d_F$ may have many different formats, for example embodying a direct sampled bandpass version of the radio signals $S_{HF}$, or an I/Q bandpass sampled version thereof.

Each of the processor units 141, 142 and 143 is adapted to process data $d_F$ derived from the navigation satellite signals $S_{BL}$ as well as to process alternative data and/or signals relating to at least one function being uncorrelated with the satellite signals $S_{BL}$. Here, the alternative data and/or signals are symbolically denoted by means of double-ended arrows $D_A$, and corresponding applications/functions are represented by generic boxes labeled 180.

Each of the data buffers 131 and 132 is adapted to store data sets [$d_F$], where each set includes a number of samples of the satellite signals $S_{BL}$. For example, one data set [$d_F$] may represent one code period of a typical satellite signal $S_{BL}$. Preferably, the device 100 includes, or is associated with, a data administration module 120, which is adapted to accomplish an alternating storage of the data $d_F$ into the data buffers 131 and 132 (i.e. in a so-called ping-pong manner), such that the data enters either a first buffer 131 or a second buffer 132. Thus, for instance data $d_F$ of one particular set can be stored into the first buffer 131 while data $d_F$ of another set [$d_F$] is being read from the second buffer 132.

Naturally, according to the invention, the data administration module 120 may be adapted to perform precorrelation related tasks in addition to the storage control in the data buffers 131 and 132. Here, however, we will not describe the detailed nature of these additional tasks.

The control module 150 is adapted to control execution of a processing job that involves producing target data $D_1$, $D_2$ and $D_3$ respectively based on a stored data set [$d_F$]. This control involves allocating individual processing tasks to at least one of the processor units 141, 142 and 143. Specifically, the control module 150 allocates the processing tasks based on a current processing load on each processor unit 141, 142 and 143. Preferably, the control module 150 allocates the processing tasks on the further basis of a type of processing to be executed relative to a performance profile of the respective processor unit; an amount of processing to be executed with respect to the data set [$d_F$]; and/or a time frame within which the processing job is to be completed. Here, the processing-type/performance-profile relationship may reflect the fact that the processing job involves execution of a number of fixed-point operations, and the processor unit is primarily adapted to perform calculations in floating-point mathematics. In such a case, the control module 150 would be less inclined to allocate a task of the job to the processor in question than if the task type and the processing profile matched perfectly.

The target data $D_1$, $D_2$, and $D_3$ may either be sent directly to a parent module 170 that has requested execution of the processing job, and/or to one or more alternative units, modules or functions in the device 160, e.g. a processor gateway 160 adapted to forward result data from the processor units 141, 142 and 143 to any higher level modules running on the data processing device 100.

According to one preferred embodiment of the invention, the control module 150 is further adapted to allocate the individual processing tasks to one or more of the processor units 141, 142 and 143 based on an allowed utilization of the respective processor unit. The allowed utilization specifies a measure of an amount of resources being potentially available for satellite signal processing. Namely, irrespective of which processing resources that are actually available in a given processor, it may be desired that a certain amount/proportion of these resources be reserved for other purposes (i.e. pertaining to the functions $D_A$ that are uncorrelated with the satellite signals $S_{BL}$). The allowed utilization parameter may be used to reflect this type of restriction.

To facilitate adequate resource planning, each processor unit 141, 142 and 143 is preferably adapted to transmit a status signal $s_1$, $s_2$ and $s_3$, respectively, to the control module 150. The status signals $s_1$, $s_2$ and $s_3$ designate a respective load status for the processor unit 141, 142 and 143. Consequently, based on the signals $s_1$, $s_2$ and $s_3$, the control module 150 may allocate the above-mentioned processing tasks.

Furthermore, each of the processor units 141, 142 and 143 is preferably adapted to receive a task specification defining a respective processing task to be executed by the unit. Here, we assume that the task specification includes at least one entry specifying a number of processing iterations to be completed with respect to the data set [$d_F$], at least one signal source identity to be discriminated, a type of processing to be performed and/or a time requirement for the processing task. In this context, one processing iteration may involve finding a particular channel (or logical entity, a signal source etc.), tracking such a channel, or extracting data associated with this channel. For example, if the processing job implies acquisition, the task specification may specify that a particular processor unit, say 141, shall perform three processing iterations with respect to the data set [$d_F$] in order to acquire signals emitted by three signal sources.

According to one preferred embodiment of the invention, each of the processor units 141, 142 and 143 is associated with a programmable module $c_1$, $c_2$ and $c_3$, respectively, which is adapted to store the task specification. The programmable modules $c_1$, $c_2$ and $c_3$ may either be an integral part of each processor unit 141, 142 and 143, or be a separate resource accessible by the processor units 141, 142 and 143. The separate resource, in turn, may either be a common resource for one or more processor units, or be a particular resource for each processor unit. Thus, whenever necessary, the control module 150 may control the affected processor unit(s) 141, 142 and/or 143 to perform a new processing task by updating the contents of the relevant programmable modules $c_1$, $c_2$ and $c_3$.

According to another preferred embodiment of the invention, the processing job is presumed to involve performing operations according to a first type of arithmetic, say of fixed-type. Furthermore, we assume that at least one of the processor units, say 142, is adapted to perform computations based on a second type of arithmetic, e.g. based on floating point mathematics. Each programmable module associated with a processor unit adapted to perform computations based on the second type of arithmetic is adapted to store an instruction set for converting a processing task from a first type of task defined in the first type of arithmetic to an equivalent task defined in the second type of arithmetic. I.e. in this example, the programmable module $c_2$ includes such an instruction set. Hence, if the processor unit 142 is designed to operate as a 3D graphics accelerator module, this unit may still function as a processing resource for processing tasks related to the digitized navigation satellite signals. Naturally, if necessary, one or more instruction sets for converting processing tasks in the opposite direction may equally well be defined and stored in applicable programmable modules $c_1$, $c_2$ and/or $c_3$.

Generally, in addition to purely resource-related reasons, task conversion may be applicable for architectural- and or regulatory-related reasons. For example, the main CPU in a portable device typically runs a non-real-time operating system, and a DSP in a mobile telephone normally runs a real-time operating system, which handles the communication stack (i.e. interaction with the speech codec, communication protocol, etc.). Moreover, it may be prohibited to interface with the code already running on the DSP during certain times/operation modes, such as during a voice call. Therefore, even though the DSP in the mobile telephone may have resources that are technically available for a processing task with respect to navigation satellite signals, it may be necessary to convert this task into a task being suited for handling by the CPU.

Figure 2:
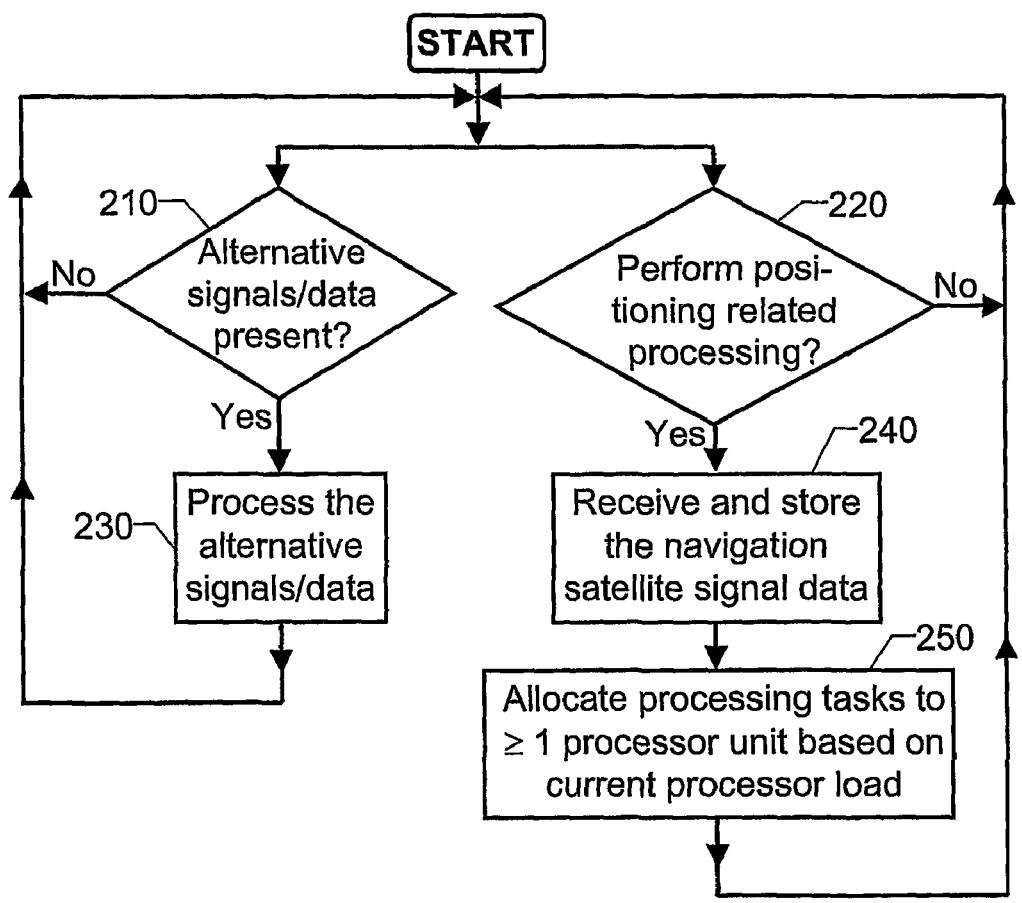
FIG. 2 illustrates, by means of a flow diagram, the general method of processing digitized navigation satellite signals according to the invention.

To sum up, we will now describe the general method of processing digitized precorrelation navigation satellite signal data according to the invention with reference to the flow diagram in FIG. 2.

An initial step 210 investigates whether any alternative data and/or signals are present, which relate to at least one function being uncorrelated with the satellite signals. Correspondingly, a step 220, preferably parallel to the step 210, investigates whether any position related processing is to be performed. If in the step 210 alternative data and/or signals are found to be present, a step 230 follows. Otherwise, the procedure loops back to the step 210 again. If in the step 220 it is found that position related processing shall be performed, it is presumed that the satellite signal data upon which this processing is to be based is ready for processing, and a step 240 follows. Otherwise, the procedure loops back to the step 220 again.

The step 230 processes the alternative data and/or signals in one or more of the processor units, e.g. the above-mentioned 141, 142 and 143. The step 240 receives satellite signal data and stores the data in the form of one or more data sets.

Subsequently, a step 250 allocates individual processing tasks of a processing job with respect to the stored data to at least one of the processor units 141, 142 and 143. The task allocation is based on a current processing load on each processor unit. By "current processing load" is here meant a load estimate being based on a latest received load report (e.g. reflected by the status signals $s_1$, $s_2$ and $s_3$), which expected to be valid until a next load estimation/report, say a number of clock cycles later. In step 250, the processing tasks are preferably further allocated based on a type of processing to be executed relative to a performance profile of the respective processor unit; an amount of processing to be executed with respect to the data set; and/or a time frame within which the processing job is to be completed is also considered when allocating these tasks.

After step 250, the procedure loops back to the steps 210 and 220 again. According to one preferred embodiment of the invention, the task allocation step is repeated at a repetition rate being determined by a size of the data set, the type of processing to be executed, a clock frequency used by one or more of the processor units and/or spectral characteristics of the satellite signals (bandwidth, sampling frequency etc.)

All of the steps, as well as any sub-sequence of steps, described with reference to FIG. 2, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc), an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted to the described embodiments in the figures, but may be varied freely within the scope of the claims.

The invention claimed is:

1. A data processing device adapted to process digitized precorrelation navigation satellite signal data ($d_F$), and to process alternative data and/or signals ($D_A$) relating to at least one function being uncorrelated with said satellite signal data ($d_F$), the device (100) comprises:
    at least two processor units (141, 142, 143) which each is adapted to process said satellite signal data ($d_F$) and to process the alternative data and/or signals ($D_A$), wherein each of the at least two processor units (141, 142, 143) is adapted to receive a task specification defining a respective processing task to be executed by the unit, and wherein each of the at least two processor units (141, 142, 143) is associated with a programmable module ($c_1$, $c_2$, $c_3$) adapted to store the task specification,
    at least one data buffer (131, 132) adapted to store data sets ([$d_F$]), each set including a number of instances of said satellite signal data ($d_F$), and
    a control module (150) adapted to control execution of a processing job involving producing target data ($D_1$, $D_2$, $D_3$) based on a data set ([$d_F$]) stored in at least one of the at least one data buffer (131, 132) by allocating individual processing tasks to at least one of the at least two processor units (141, 142, 143) based on a current processing load on each processor unit (141, 142; 143),
    wherein the processing job involves performing operations according to a first type of arithmetic, at least one of the at least two processor units (141, 142, 143) is adapted to perform computations based on a second type of arithmetic, and each of said programmable modules ($c_1$, $c_2$, $c_3$) being associated with said at least two processor units (141, 142, 143) is adapted to store an instruction set adapted to convert a processing task from a first type of task defined in the first type of arithmetic to an equivalent task defined in the second type of arithmetic.

2. The device (100) according to claim 1, wherein the control module (150) is adapted to allocate the individual processing tasks to at least one of the at least two processor units (141, 142, 143) further based on an amount of processing to be executed with respect to the data set ([$d_F$]).

3. The device (100) according to claim 1, wherein the control module (150) is adapted to allocate the individual processing tasks to at least one of the at least two processor units (141, 142, 143) further based on a time frame within which the processing job is to be completed.

4. The device (100) according to claim 1, wherein the control module (150) is adapted to allocate the individual processing tasks to the at least one of the at least two processor units (141, 142, 143) based on an allowed utilization of the respective processor unit, the allowed utilization specifying a measure of resources being potentially available for satellite signal processing.

5. The device (100) according to claim 1, wherein each of the at least two processor units (141, 142, 143) is adapted to produce a set of target data ($D_1$, $D_2$, $D_3$) resulting from a respective processing task completed by the unit.

6. The device (100) according to claim 1, wherein each of the at least two processor units (141, 142, 143) is adapted to transmit a status signal ($s_1$, $s_2$, $s_3$) to the control module (150), the status signals ($s_1$, $s_2$, $s_3$) reflecting a respective load status for the processor unit (141, 142, 143), and the control module (150) is adapted to allocate said processing tasks based on the status signals ($s_1$, $s_2$, $s_3$).

7. The device (100) according to claim 1, wherein the task specification includes at least one entry specifying at least one of: a number of processing iterations to be completed with respect to the data set ($[d_F]$), at least one signal source identity, a type of processing to be performed and a time requirement for the processing task.

8. The device (100) according to claim 1, wherein at least one of the at least two processor units (141, 142, 143) is represented by a central processing unit.

9. The device (100) according to claim 8, wherein the control module (150) is implemented in software.

10. The device (100) according to claim 8, wherein the control module (150) is included in one of the at least two processor units (141, 142, 143).

11. The device (100) according to claim 10, wherein the control module (150) is included in a central processing unit.

12. The device (100) according to claim 1, wherein at least one of the at least two processor units (141, 142, 143) is represented by at least one of a digital signal processing, a graphics processing unit, a vector processor unit, a media processing unit, an audio processing unit, a floating-point processing unit and an accelerator unit.

13. A method of processing digitized precorrelation navigation satellite signal data ($d_F$), and alternative data and/or signals ($D_A$) relating to at least one function being uncorrelated with said satellite signal data ($d_F$), the method comprising:
    investigating whether or not at least one of the alternative data and/or signals ($D_A$) is present, and if so processing the alternative data and/or signals ($D_A$),
    investigating whether or not positioning related processing is to be performed, and if so receiving the satellite signal data ($d_F$), and
    storing the satellite signal data ($d_F$) in at least one data buffer (131, 132) in the form of a data set ($[d_F]$), the data set ($[d_F]$) including a number of instances of said satellite signal data ($d_F$), characterized by the method involving production of target data ($D_1$, $D_2$, $D_3$) based on a data set ($[d_F]$) stored in at least one of the at least one data buffer (131, 132) by using at least two processor units (141, 142, 143), wherein a programmable module ($c_1$, $c_2$, $c_3$) being associated with each of the at least two processor units (141, 142, 143), and the method comprising storing a respective task specification in at least one of said programmable modules ($c_1$, $c_2$, $c_3$), the task specification defining a respective processing task to be executed by the unit, the method comprising allocating individual processing tasks of a processing job to at least one of the at least two processor units (141, 142, 143) based on a current processing load on each processor unit (141, 142; 143), comprising performing operations according to a first type of arithmetic, at least one of the at least one processor units (141, 142, 143) being adapted to perform computations based on a second type of arithmetic, and each of said programmable modules ($c_1$, $c_2$, $c_3$) being associated with said at least one processor unit (141, 142, 143) storing an instruction set adapted to convert a processing task from a first type of task defined in the first type of arithmetic to an equivalent task defined in the second type of arithmetic.

14. The method according to claim 13 further comprising allocating individual processing tasks of a processing job to at least one of the at least two processor units (141, 142, 143) further based on an amount of processing to be executed with respect to the data set ($[d_F]$).

15. The method according to claim 13 further comprising allocating individual processing tasks of a processing job to at least one of the at least two processor units, (141, 142, 143) further based on a time frame within which the processing job is to be completed.

16. The method according to claim 13 further comprising repeating the task allocation step at a repetition rate being determined by at least one of a size of the data set ($[d_F]$), the type of processing to be executed, a clock frequency used by the at least two processor units (141, 142, 143), and spectral characteristics of received satellite signals ($S_{BL}$) from which the satellite signal data ($d_F$) is derived.

17. The method according to a claim 13 further comprising allocating the individual processing tasks to the at least one of the at least two processor units (141, 142, 143) based on an allowed utilization of the respective processor unit, the allowed utilization specifying a measure of resources being potentially available for satellite signal processing.

18. The method according to claim 13 further comprising producing, in each of the at least two processor units (141, 142, 143), a set of target data ($D_1$, $D_2$, $D_3$) resulting from a respective processing task completed by the unit.

19. The method according to claim 13 further comprising providing a control module (150) with status signals ($s_1$, $s_2$, $s_3$) reflecting a respective load status for each of the at least two processor units (141, 142, 143), the control module (150) being adapted to allocate said processing tasks based on the status signals ($s_1$, $s_2$, $s_3$).

20. A computer program product stored in a non-transitory computer readable medium and directly loadable into the memory of a computer, comprising:
    first computer instruction code for investigating whether or not at least one of the alternative data and/or signals ($D_A$) is present, and if so processing the alternative data and/or signals ($D_A$),
    second computer instruction code for investigating whether or not positioning related processing is to be performed, and if so receiving the satellite signal data ($D_F$),
    third computer instruction code for storing the satellite signal data ($d_F$) in at least one data buffer (131, 132) in the form of a data set ($[d_F]$), the data set ($[d_F]$) including a number of instances of said satellite signal data ($d_F$), characterized by the method involving production of target data ($D_1$, $D_2$, $D_3$) based on a data set ($[d_F]$) stored in at least one of the at least one data buffer (131, 132) by using at least two processor units (141, 142, 143), wherein a programmable module ($c_1$, $c_2$, $c_3$) being associated with each of the at least two processor units (141, 142, 143),
    fourth computer instruction code for storing a respective task specification in at least one of said programmable modules ($c_1$, $c_2$, $c_3$), the task specification defining a respective processing task to be executed by the unit,
    fifth computer instruction code for allocating individual processing tasks of a processing job to at least one of the at least two processor units (141, 142, 143) based on a current processing load on each processor unit (141, 142; 143), sixth computer instruction code for performing operations according to a first type of arithmetic, at least one of the at least one processor units (141, 142, 143) being adapted to perform computations based on a second type of arithmetic, and each of said programmable modules ($c_1$, $c_2$, $c_3$) being associated with said at least one processor unit (141, 142, 143), and seventh computer instruction code for storing an instruction set adapted to convert a processing task from a first type of task defined in the first type of arithmetic to an equivalent task defined in the second type of arithmetic.

21. A non-transitory computer readable medium (155), having a program recorded thereon, said computer readable medium comprising:

first computer instruction code for investigating whether or not at least one of the alternative data and/or signals ($D_A$) is present, and if so processing the alternative data and/or signals ($D_A$), second computer instruction code for investigating whether or not positioning related processing is to be performed, and if so receiving the satellite signal data ($d_F$), third computer instruction code for storing the satellite signal data ($d_F$) in at least one data buffer (131, 132) in the form of a data set ($[d_F]$), the data set ($[d_F]$) including a number of instances of said satellite signal data ($d_F$), characterized by the method involving production of target data ($D_1$, $D_2$, $D_3$) based on a data set ($[d_F]$) stored in at least one of the at least one data buffer (131, 132) by using at least two processor units (141, 142, 143), wherein a programmable module ($c_1$, $c_2$, $c_3$) being associated with each of the at least two processor units (141, 142, 143), fourth computer instruction code for storing a respective task specification in at least one of said programmable modules ($c_1$, $c_2$, $c_3$), the task specification defining a respective processing task to be executed by the unit, fifth computer instruction code for allocating individual processing tasks of a processing job to at least one of the at least two processor units (141, 142, 143) based on a current processing load on each processor unit (141, 142; 143), sixth computer instruction code for performing operations according to a first type of arithmetic, at least one of the at least one processor units (141, 142, 143) being adapted to perform computations based on a second type of arithmetic, and each of said programmable modules ($c_1$, $c_2$, $c_3$) being associated with said at least one processor unit (141, 142, 143), and seventh computer instruction code for storing an instruction set adapted to convert a processing task from a first type of task defined in the first type of arithmetic to an equivalent task defined in the second type of arithmetic.

\* \* \* \* \*